(12) United States Patent
Beagen

(10) Patent No.: US 8,074,894 B2
(45) Date of Patent: Dec. 13, 2011

(54) SECONDARY MIXING VALVE HOT PORT

(75) Inventor: Joseph William Beagen, West Warwick, RI (US)

(73) Assignee: Honeywell International Inc., Morristown, NJ (US)

( * ) Notice: Subject to any disclaimer, the term of this patent is extended or adjusted under 35 U.S.C. 154(b) by 431 days.

(21) Appl. No.: 12/273,370

(22) Filed: Nov. 18, 2008

(65) Prior Publication Data

US 2010/0123015 A1   May 20, 2010

(51) Int. Cl.
*G05D 23/185* (2006.01)
*G05D 23/13* (2006.01)
(52) U.S. Cl. ............... 236/12.2; 236/12.1; 236/12.11
(58) Field of Classification Search .............. 236/12.2, 236/12.1, 12.11, 12.12, 12.17; 137/625.4, 137/625.48, 636
See application file for complete search history.

(56) References Cited

U.S. PATENT DOCUMENTS

| | | |
|---|---|---|
| 1,788,429 A | 1/1931 | Groble |
| 1,942,270 A | 1/1934 | Resek |
| RE19,488 E | 3/1935 | Russell et al. |
| 2,052,987 A | 9/1936 | Persons |
| 2,912,215 A | 11/1959 | Forrester |
| 3,703,673 A | 11/1972 | Balz |
| 3,765,604 A | 10/1973 | Trubert et al. |
| 3,792,812 A | 2/1974 | Knapp |
| 3,872,363 A | 3/1975 | Gross |
| 3,929,283 A | 12/1975 | Delpla |
| 4,029,256 A | 6/1977 | Dauga |
| 4,249,695 A | 2/1981 | Dreibelbis |
| 4,286,749 A | 9/1981 | Oguma |
| 4,294,402 A | 10/1981 | Vollmer |
| 4,318,530 A | 3/1982 | Lissmyr et al. |
| 4,363,461 A | 12/1982 | Smejkal |
| 4,551,072 A | 11/1985 | Barall |
| 4,565,219 A | 1/1986 | Kunogi |
| 4,595,081 A | 6/1986 | Parsons |
| 4,607,788 A | 8/1986 | Bendall et al. |
| 4,613,978 A | 9/1986 | Kurth et al. |
| 4,629,157 A | 12/1986 | Tsuchiya et al. |
| 4,669,653 A | 6/1987 | Avelov |

(Continued)

FOREIGN PATENT DOCUMENTS

DE   3300600   7/1983

(Continued)

OTHER PUBLICATIONS

"Integrated Mixing Device, (IMD) Installation and Operating Instruction Manual," 6 pages, Jan. 2007.

(Continued)

*Primary Examiner* — Chen Wen Jiang
(74) *Attorney, Agent, or Firm* — Seager, Tufte & Wickhem LLC

(57) ABSTRACT

A thermostatic mixing valve for mixing a hot fluid and a cold fluid to produce a tempered mixed fluid stream. The thermostatic mixing valve may have a valve body that defines a cold fluid inlet port, a hot fluid inlet port, a mixing chamber, a mixed fluid outlet port in fluid communication with the mixing chamber, and a hot fluid outlet port in fluid communication with the hot fluid inlet port and disposed upstream of the mixing chamber. In some cases, the hot fluid outlet port may be used to provide hot water directly to an appliance or other fixture that can use non-tempered hot water.

18 Claims, 12 Drawing Sheets

U.S. PATENT DOCUMENTS

| | | | |
|---|---|---|---|
| 4,807,700 A | 2/1989 | Wilkins | |
| 4,836,497 A | 6/1989 | Beeson | |
| 4,845,416 A | 7/1989 | Scholl et al. | |
| 4,863,097 A | 9/1989 | Avelov | |
| 4,863,100 A | 9/1989 | Erhardt et al. | |
| 5,129,576 A | 7/1992 | Pullen et al. | |
| 5,148,976 A | 9/1992 | Reid | |
| 5,161,737 A | 11/1992 | Olmstead et al. | |
| 5,203,496 A | 4/1993 | Kline | |
| 5,232,960 A | 8/1993 | Wagner et al. | |
| 5,295,562 A | 3/1994 | Hajny et al. | |
| 5,340,018 A | 8/1994 | MacDonald | |
| 5,341,987 A | 8/1994 | Ackroyd | |
| 5,347,956 A | 9/1994 | Hughes | |
| 5,379,936 A | 1/1995 | Kline | |
| 5,397,098 A | 3/1995 | Schreiner | |
| 5,462,224 A | 10/1995 | Enoki et al. | |
| 5,466,995 A | 11/1995 | Genga | |
| 5,503,183 A * | 4/1996 | Fenn et al. | 137/597 |
| 5,529,282 A | 6/1996 | Lebkuchner | |
| 5,551,630 A | 9/1996 | Enoki et al. | |
| 5,572,985 A | 11/1996 | Benham | |
| 5,662,542 A | 9/1997 | Birchmeier | |
| 5,701,387 A | 12/1997 | McGugan | |
| 5,743,463 A | 4/1998 | Ueno et al. | |
| 5,779,139 A | 7/1998 | Ueno | |
| 5,806,761 A | 9/1998 | Enoki et al. | |
| 5,970,997 A | 10/1999 | Hudson et al. | |
| 5,983,937 A | 11/1999 | Makihara et al. | |
| 5,988,514 A | 11/1999 | Huang | |
| 6,021,955 A | 2/2000 | Pasch et al. | |
| 6,032,924 A | 3/2000 | Castle | |
| 6,042,015 A | 3/2000 | Eveleigh et al. | |
| 6,053,416 A | 4/2000 | Specht et al. | |
| 6,073,907 A | 6/2000 | Schreiner, Jr. et al. | |
| 6,079,625 A | 6/2000 | Lebkuchner | |
| 6,085,984 A | 7/2000 | Chamot et al. | |
| 6,095,485 A | 8/2000 | Lebkuchner et al. | |
| 6,097,123 A | 8/2000 | Weiss et al. | |
| 6,100,655 A | 8/2000 | McIntosh | |
| 6,119,947 A | 9/2000 | Couture et al. | |
| 6,182,683 B1 | 2/2001 | Sisk | |
| 6,227,961 B1 | 5/2001 | Moore et al. | |
| 6,250,559 B1 | 6/2001 | Knauss | |
| 6,315,209 B1 | 11/2001 | Tripp | |
| 6,315,210 B1 | 11/2001 | Kline | |
| 6,318,638 B1 | 11/2001 | Banno et al. | |
| 6,328,219 B1 | 12/2001 | Taylor et al. | |
| 6,349,253 B1 | 2/2002 | Bellinger | |
| 6,360,956 B1 | 3/2002 | Taylor et al. | |
| 6,402,041 B2 | 6/2002 | Jelloul et al. | |
| 6,471,184 B1 | 10/2002 | McIntosh | |
| 6,536,464 B1 | 3/2003 | Lum et al. | |
| 6,575,377 B1 | 6/2003 | Graves | |
| 6,688,438 B2 | 2/2004 | Bucher | |
| 6,726,110 B2 | 4/2004 | Heinzelmann | |
| 6,732,937 B2 | 5/2004 | Graves | |
| 6,929,188 B2 * | 8/2005 | Taylor et al. | 236/12.12 |
| 6,979,965 B2 | 12/2005 | McMillan et al. | |
| 7,073,772 B2 | 7/2006 | Min | |
| 2006/0090798 A1 * | 5/2006 | Beagen et al. | 137/602 |
| 2010/0123014 A1 * | 5/2010 | Beagen | 236/12.2 |

FOREIGN PATENT DOCUMENTS

| | | |
|---|---|---|
| DE | 3614735 | 11/1987 |
| DE | 4123048 | 2/1992 |
| DE | 4423240 | 2/1996 |
| EP | 0000768 | 2/1979 |
| GB | 2096274 | 10/1982 |
| GB | 2275097 | 8/1994 |
| JP | 01-288685 | 11/1989 |
| JP | 9196216 | 7/1997 |
| JP | 11218248 | 8/1999 |
| WO | 9530939 | 11/1995 |
| WO | 9616362 | 5/1996 |
| WO | 9732147 | 9/1997 |

OTHER PUBLICATIONS

Honeywell, Braukmann TM 200/KB 191 "Intallation Instructions," 3 pages, May 1997.

* cited by examiner

SECONDARY MIXING VALVE HOT PORT

TECHNICAL FIELD

The present disclosure relates generally to the field of mixing valves and more particularly to thermostatic mixing valves and systems for mixing fluids of dissimilar temperature.

BACKGROUND

Thermostatic mixing valves are used in a variety of applications for mixing fluids of dissimilar temperatures to produce a tempered fluid discharge output temperature. For example, and in one illustrative application, thermostatic mixing valves are commonly used in conjunction with water heaters. Water heaters are frequently used to supply hot water to desired locations within a house, office building, or other structure. To regulate the temperature of water discharged by the water heater, a thermostatic mixing valve can be connected to the hot water outlet of the water heater, allowing hot water discharged from the water heater to be mixed with cold water supplied to the structure to produce a relatively constant tempered discharge output temperature. The tempered water discharged from the mixing valve can be fed into the structure's hot water piping for subsequent use by the occupants. Such mixing valves are typically configured such that the temperature of the mixed water remains constant or nearly constant regardless of the temperature and flow rate of the hot and cold water supplied to the mixing valve.

With the construction of larger homes and an increased usage of hot water, the demand for water heaters having larger heating capacities has grown significantly. Some water heaters are configured to produce hot water that is at a temperature that is significantly hotter than that desired in the structure's hot water piping. By increasing the temperature of the water supplied by the water heater, a greater amount of cold water may be mixed with the hot water to increase the effective heating capacity of the water heater. Some thermostatic mixing valves have a temperature adjustment mechanism that allows a contractor or other personnel to adjust the discharge water temperature that is produced at the output of the mixing valve. In some instances, it may be desirable to include an optional secondary hot port for providing hot water directly to an appliance or other fixture that can use non-tempered hot water (e.g. water provided directly from a water heater or the like).

SUMMARY

The disclosure relates to a thermostatic mixing valve that includes a secondary hot port for providing hot water directly to an appliance or other fixture that can use non-tempered hot water. The secondary hot port may be used to supply non-tempered hot water to a dishwasher, a clothes washer, a humidifier, and/or any other suitable appliance, fixture or device, as desired. The secondary hot port may reduce or eliminate the need for a separate "T" connector off of the water heater source.

In some embodiments, the thermostatic mixing valve may also resist accidental adjustment of the discharge water temperature, while not requiring specialized tools for purposeful adjustment. In an illustrative but non-limiting example, a thermostatic mixing valve includes a valve body defining a cold fluid inlet, a hot fluid inlet, a mixed fluid outlet, and a mixing chamber. Some configurations may include a recirculation inlet and/or a secondary hot port, but this is not required. In the illustrative embodiment, a fluid flow regulator is provided within the valve body for adjusting the relative flow of hot and cold fluid to produce a desired mixed water discharge temperature at the mixed fluid outlet of the mixing valve. A temperature adjustment mechanism is provided for adjusting the mixed water discharge temperature at the mixed fluid outlet of the mixing valve. The temperature adjustment mechanism may include a tamper resistant feature for reducing the likelihood that the temperature adjustment mechanism is accidently adjusted.

In some embodiments, the temperature adjustment mechanism includes a hand wheel operatively coupled to the fluid flow regulator. When so provided, the tamper resistant feature may cause the hand wheel to have a non-temperature adjusting position and a temperature adjusting position. In some cases, the hand wheel may be biased toward the non-temperature adjusting position, whereby the user must overcome the bias before the hand wheel enters the temperature adjusting position.

In some instances, the temperature adjustment mechanism may include an adjustment screw that is rotatably disposed within a side wall of the valve body and is configured to move the fluid flow regulator within the valve body in order to adjust the mixed water discharge temperature at the mixed fluid outlet of the mixing valve. During operation, and when in the temperature adjusting position, the hand wheel or the like may be rotated in either a clockwise or counterclockwise direction to adjust the positioning of the fluid flow regulator within the valve body, which then adjusts the mixed water discharge temperature at the mixed fluid outlet of the mixing valve. When in the non-temperature adjusting position, the hand wheel or the like may be disengaged from adjusting the positioning of the fluid flow regulator within the valve body. In some instances, the hand wheel may be biased via a spring or the like toward the non-temperature adjusting position, whereby the user must overcome the bias of the spring before the hand wheel enters the temperature adjusting position.

The above summary is not intended to describe each and every disclosed embodiment or every implementation of the disclosure. The Description that follows more particularly exemplifies the various illustrative embodiments.

BRIEF DESCRIPTION OF THE DRAWINGS

The disclosure may be more completely understood in consideration of the following detailed description of various embodiments in connection with the accompanying drawings, in which.

Figure 1:
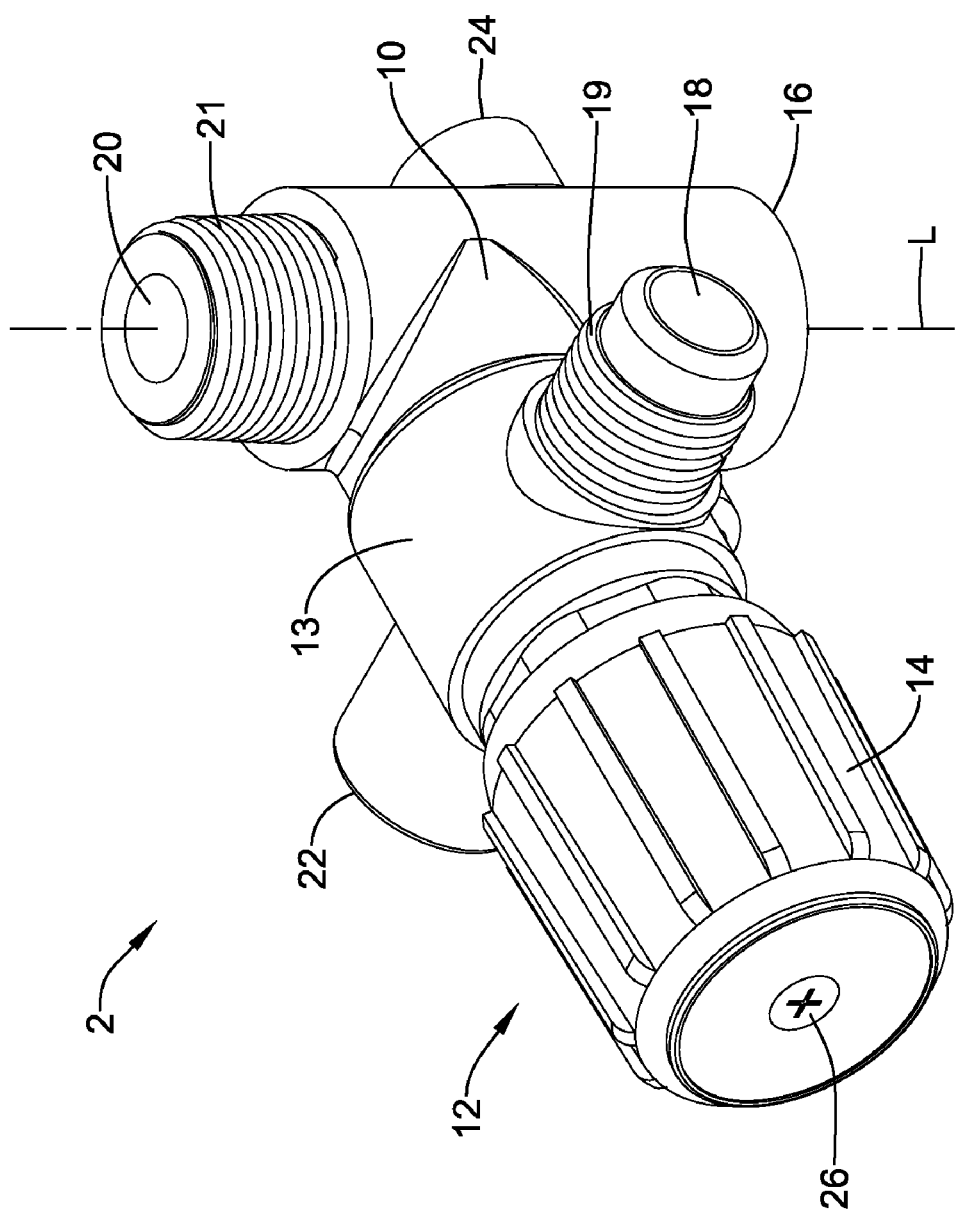
FIG. 1 is a perspective view of an illustrative but non-limiting thermostatic mixing valve having a temperature adjustment mechanism and a tamper resistant feature.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DESCRIPTION

The following description should be read with reference to the drawings in which similar elements in different drawings have similar reference numbers. The description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

FIG. 1 is a perspective view of an illustrative but non-limiting thermostatic mixing valve 2 having a temperature adjustment mechanism 12 and a tamper resistant feature. In the illustrative embodiment of FIG. 1, the temperature adjustment mechanism 12 is shown as a hand wheel 14. However, it is contemplated that the temperature adjustment mechanism 12 may take on any suitable form that is capable of allowing a contractor or other personnel to adjust the discharge temperature of the thermostatic mixing valve 2.

The illustrative thermostatic mixing valve 2 includes a valve body 10 that has a hot fluid inlet 16, a cold fluid inlet 18 and a mixed fluid outlet 20. The hot fluid inlet 16 is configured to receive fluid at an elevated temperature from, for example, a water heater, a boiler, or any other suitable heating source, and can include a tailpiece fitting (not shown) or other suitable connector for connecting the hot fluid inlet 16 to the supply of hot fluid. Likewise, the cold fluid inlet 18 is configured to receive colder fluid from, for example, a cold water supply, and can include a tailpiece fitting 19 or other suitable connector for connecting the cold fluid inlet 18 to the supply of colder fluid.

In the illustrative embodiment, the mixed fluid outlet 20 is configured to output fluid that is a mixture of the hot fluid received at the hot fluid inlet 16 and the colder fluid received at the cold fluid inlet 18, resulting in a discharge fluid having a tempered discharge temperature. The mixed fluid outlet 20 may be fluidly connected to the hot water piping of a building or other structure, and can include a tailpiece fitting 21 or other suitable connector similar to that provided for the hot and cold fluid inlets 16, 18.

In some cases, the mixing valve 2 may also include an optional recirculation inlet 22 configured to receive tempered water from the hot water piping of the building or other structure, and can include a tailpiece fitting (not shown) or other suitable connector. The recirculation inlet 22 may be used to recirculate water that has previously been delivered to the hot water piping back to the mixing valve 2. The recirculation inlet 22 may be useful in ensuring that hot water at the tempered temperature is immediately available at a desired location within the building, such as in a shower or the like.

The illustrative mixing valve 2 may also include an optional secondary hot port 24 for providing hot water directly to an appliance or other fixture that can use non-tempered hot water (e.g. water provided directly from a water heater or the like). For example, the optional secondary hot port 24 may be used to supply non-tempered hot water to a dishwasher, a clothes washer, a humidifier, and/or any other suitable appliance, fixture or device, as desired. The secondary hot port 24 may reduce or eliminate the need for a separate "T" connector off of the water heater source. The secondary hot port 24 can include a tailpiece fitting (not shown) or other suitable connector. The tailpiece fittings may each include a union sweat fitting, threaded fitting (e.g. NPT, NPS, etc.), compression fitting, PEX fitting, and/or any other suitable fitting that can be used to connect the various inlets and outlets of the mixing valve 2 to the other components of the installed system. A threaded coupling (not shown) can be used to secure each of the tailpiece fittings 19, 21 to the valve body 10, if desired.

As can be further seen in FIG. 1, the mixing valve 2 may have a configuration wherein the hot fluid inlet 16 and mixed fluid outlet 20 are vertically and axially aligned along an axis L of the longitudinal portion of valve body 10. This may allow the mixing valve to be mounted "in line" with a water heater hot water outlet pipe, which can simplify installation. The cold water inlet 18, in turn, may enter the valve body 10 at an angle orthogonal to the longitudinal axis L to permit direct access to the cold water inlet port provided on many conventional water heaters.

In the illustrative embodiment of FIG. 1, recirculation inlet 22 is shown entering the valve body 10 at an angle orthogonal to the longitudinal axis L, but in a direction opposite that of the cold water inlet 18. In some cases, recirculation inlet 22 may enter valve body 10 at a different angle. While mixing valve 2 is shown as having recirculation inlet 22 in the illustrated embodiment, the recirculation inlet 22 is optional and thus may be excluded. Likewise, the secondary hot port 24 may exit the valve body 10 at an angle orthogonal to the longitudinal axis L to permit direct access to the secondary hot port 24. In the illustrative embodiment, the secondary hot port 24 is positioned at a location upstream from a mixing chamber such that non-tempered hot water is available directly from the hot water source. As with the recirculation inlet 22, the secondary hot port 24 is optional and not required.

During operation, the mixing valve 2 can be adjusted to proportionately mix cold and hot water received at each of the water inlets 16, 18, which can then be outputted as tempered water at a relatively constant, pre-selected temperature through the mixed water outlet 20. In certain applications, for example, the mixing valve 2 can be configured to output water at a relatively constant or mixed water temperature of about 120° F., while permitting a water heater to operate at elevated temperatures in the range of, for example, about 120° F. to 180° F.

As discussed above, some water heaters may be configured to produce hot water that is at a temperature that is significantly hotter than that desired in the structure's hot water piping. By increasing the temperature of the water supplied by the water heater, a greater amount of cold water may be mixed with the hot water to increase the effective heating capacity of the water heater. Also, some water heaters operate at a higher efficiency when the operating temperature is elevated. For an 80-gallon water heater, for example, such an increase in the operating temperature may result in an increase in the effective hot water capacity that is similar to that of a 120-gallon water heater operating at a lower temperature. It should be understood, however, that the mixing valve 2 and/or water heater can be configured to operate at other temperature ranges, if desired.

In the illustrative embodiment, a temperature adjustment device 12 is disposed within a side housing 13 of the valve body 10, and can be provided to adjust the temperature of fluid discharged from the mixing valve 2. In residential water heating systems, for example, the temperature selection device 12 can be used to adjust the mixing valve 2 to output tempered water at a set-point temperature in the range of about 70° F. to 145° F., 70° F. to 120° F., 90° F. to 130° F., or any other temperature range as desired. The set-point temperature selected by the temperature selection device 12 may vary based on the application. In the illustrative embodiment, the temperature adjustment device 12 includes a hand wheel 14 that can manually be turned by a user. However, it is contemplated that the temperature adjustment device 12 may include any suitable mechanism for adjusting the set-point" of the mixing valve 2.

Figure 1A:
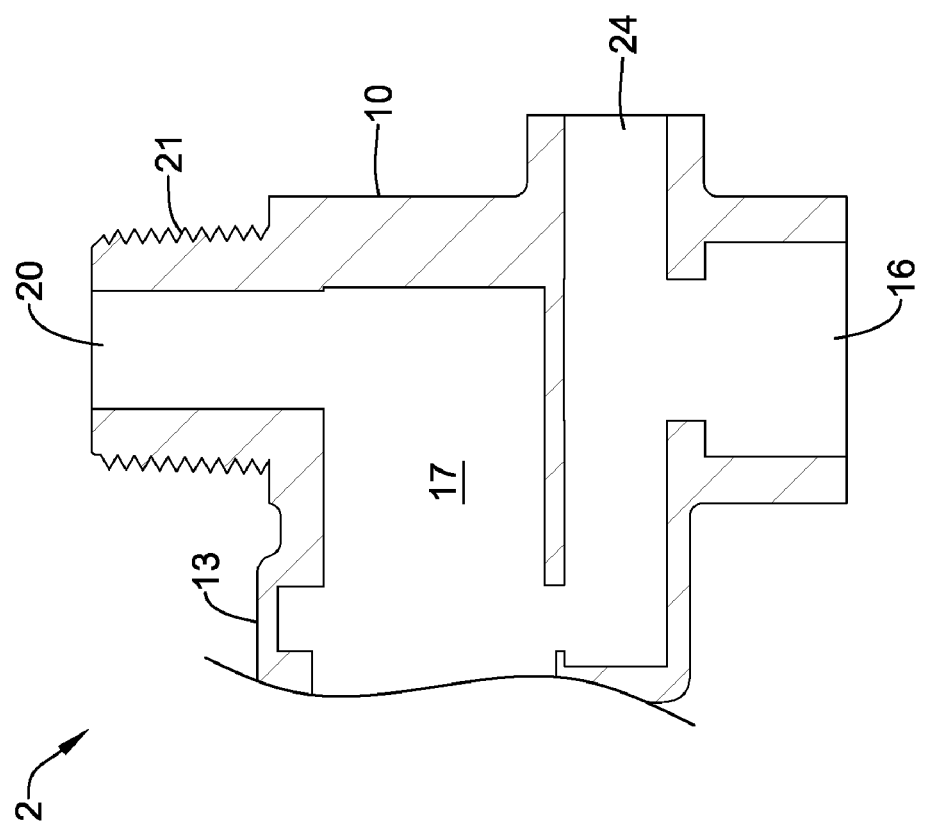
FIG. 1A is a partial cross-sectional view of the illustrative thermostatic mixing valve of FIG. 1.

FIG. 1A is a partial cross-section of the illustrative mixing valve 2 shown in FIG. 1. The temperature adjustment portion of the valve has been removed for clarity. As can be further seen in FIG. 1A, the mixing valve 2 may have a configuration wherein the hot fluid inlet 16 and mixed fluid outlet 20 are vertically and axially aligned along an axis of the longitudinal portion of valve body 10. This may allow the mixing valve to be mounted "in line" with a water heater hot water outlet pipe, which can simplify installation. The cold water inlet (not shown), in turn, may enter the valve body 10 at an angle orthogonal to the longitudinal axis to permit direct access to the cold water inlet port provided on many conventional water heaters. The hot fluid and cold fluid may be in fluid communication with mixing chamber 17 where the hot and cold fluids may mix prior to exiting the valve through the mixed fluid outlet 20, which may also be in fluid communication with mixing chamber 17. While not explicitly shown in this embodiment, in some embodiments, the mixing of the hot and cold fluids may be facilitated with a mixing mechanism such as that discussed with respect to FIGS. 4-6.

The illustrative mixing valve 2 may also include an optional secondary hot port 24 for providing hot water directly to an appliance or other fixture that can use non-tempered hot water (e.g. water provided directly from a water heater or the like). As can be seen in FIG. 1A, the secondary hot port 24 may be disposed at a location upstream of the mixing chamber 17 such that non-tempered water may be available directly from the mixing valve 2. For example, the optional secondary hot port 24 may be used to supply non-tempered hot water to a dishwasher, a clothes washer, a humidifier, and/or any other suitable appliance, fixture or device, as desired. The secondary hot port 24 may reduce or eliminate the need for a separate "T" connector off of the water heater source.

Figure 2A:
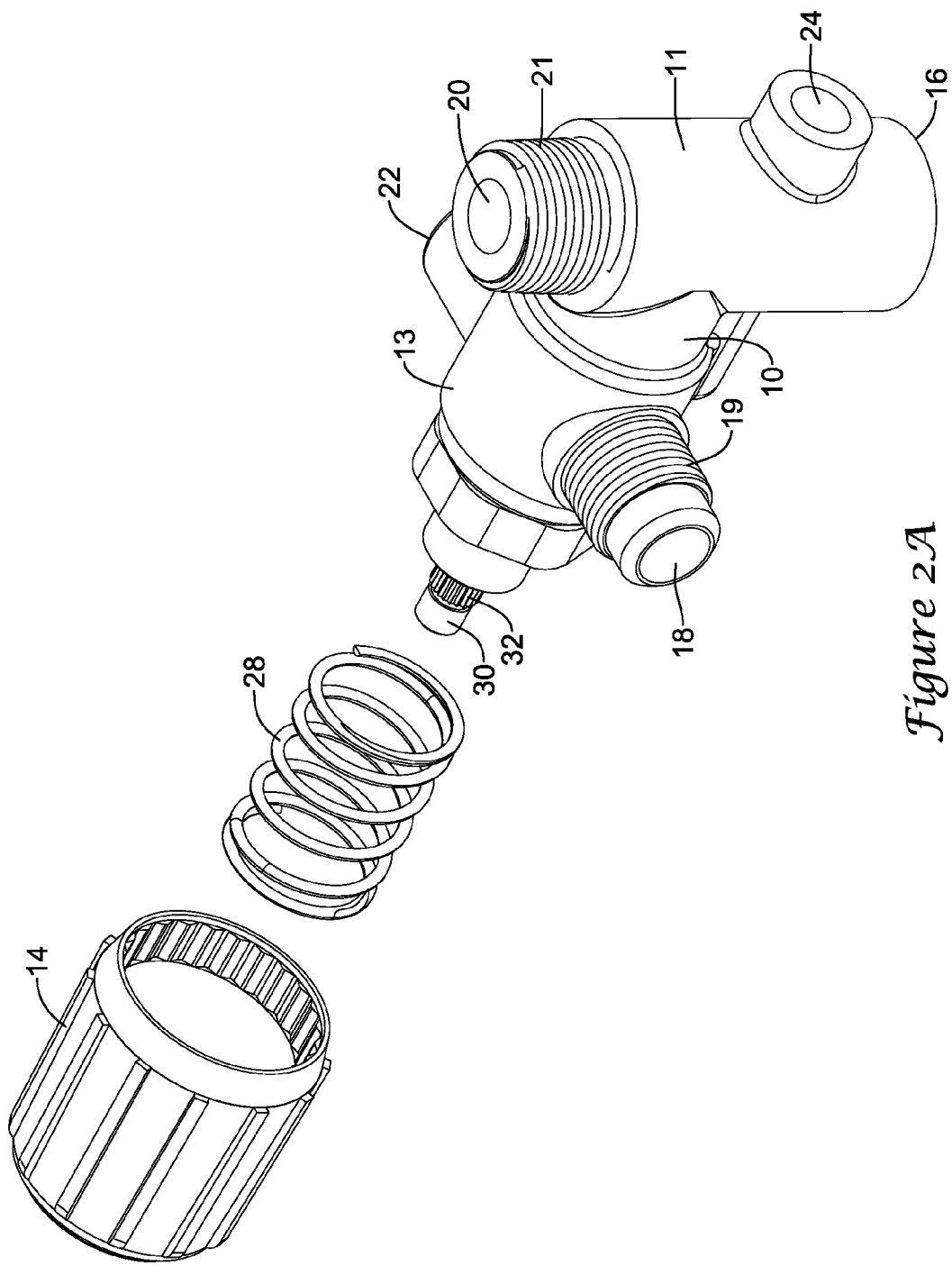
FIG. 2A is an exploded view of the illustrative thermostatic mixing valve of FIG. 1.
Figure 2B:
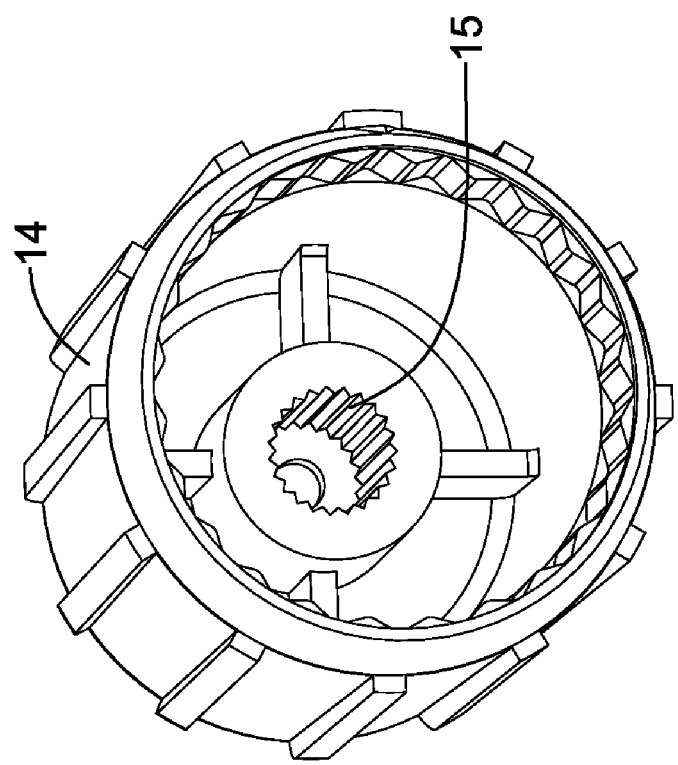
FIG. 2B is an end view of the hand wheel of the illustrative thermostatic mixing valve of FIG. 1.

As better shown in FIGS. 2A-2B, the temperature adjustment device 12 may also include a temper resistant feature for reducing the likelihood that the temperature adjustment mechanism 12 is accidently adjusted. The hand wheel 14 may be attached using an attachment screw 26. FIG. 2A is an exploded view of the illustrative thermostatic mixing valve 2 of FIG. 1 while FIG. 2B is an end view of the hand wheel 14.

As seen in FIG. 2A, the hand wheel 14 may be disposed over a biasing element such as a spring 28. The spring 28 is disposed over a temperature adjusting screw 30, and biases the hand wheel 14 away from the valve body 10. The hand wheel 14 may include a first engagement surface 15, seen in FIG. 2B, while the temperature adjusting screw 30 may include a second engagement surface 32. It will be appreciated that the first engagement surface 15 and the second engagement surface 32 may each have profiles that permit relative axial movement between the hand wheel 14 and the temperature adjusting screw 30, yet limit relative rotational movement when the first engagement surface 15 has engaged the second engagement surface 32. The first engagement surface 15 and the second engagement surface 32 may be of any shape or configuration that can selectively engage the hand wheel 14 and the adjustment screw 30 when the hand wheel 14 is pushed inward toward the valve body 10 sufficiently far against the bias of the spring 28.

In the illustrated embodiment, the first engagement surface 15 can be seen as having a sawtooth, or alternating spline and groove profile. Similarly, the second engagement surface 32 can be seen as having a sawtooth, or alternating spline and groove profile. It will be appreciated, for example, that one or more splines on the first engagement surface 15 may engage one or more grooves on the second engagement surface 32. In some cases, one or more splines on the second engagement surface 32 may engage one or more splines on the first engagement surface 15. In some instances, for example, the first engagement surface 15 may include only one or a few splines, while the second engagement surface 32 may include only one or a few grooves, or vice versa. In some cases, the first engagement surface 15 and or the second engagement surface 32 may represent gear teeth.

During operation, the hand wheel 14 may be pushed inward toward the valve body 10 overcoming the bias of the spring 28. Once the hand wheel 14 is pushed sufficiently far such that the first engagement surface 15 engages the second engagement surface 32, the hand wheel 14 enters a temperature adjusting position. Once in the temperature adjustment position, the hand wheel 14 may be rotated in a clockwise and/or counterclockwise direction to adjust the positioning of the temperature adjustment screw 30, and thus the mixed water discharge temperature at the mixed fluid outlet 20 of the mixing valve 2. When the hand wheel 14 is released, the spring 28 pushes the hand wheel 14 away from the valve body 2 sufficiently far such that the first engagement surface 15 disengages the second engagement surface 32, and the hand wheel 14 enters a non-temperature adjusting position.

When in the non-temperature adjustment position, the hand wheel 14 can be rotated in a clockwise and/or counter-clockwise direction without adjusting the positioning of the temperature adjustment screw 30. This may reduce the likelihood that the temperature adjustment screw 30, and thus the mixed water discharge temperature at the mixed fluid outlet 20 of the mixing valve 2, is accidently adjusted by the user. Thus, the thermostatic mixing valve 2 may resist accidental adjustment of the discharge water temperature, while not requiring specialized tools for purposeful adjustment.

Figure 3:
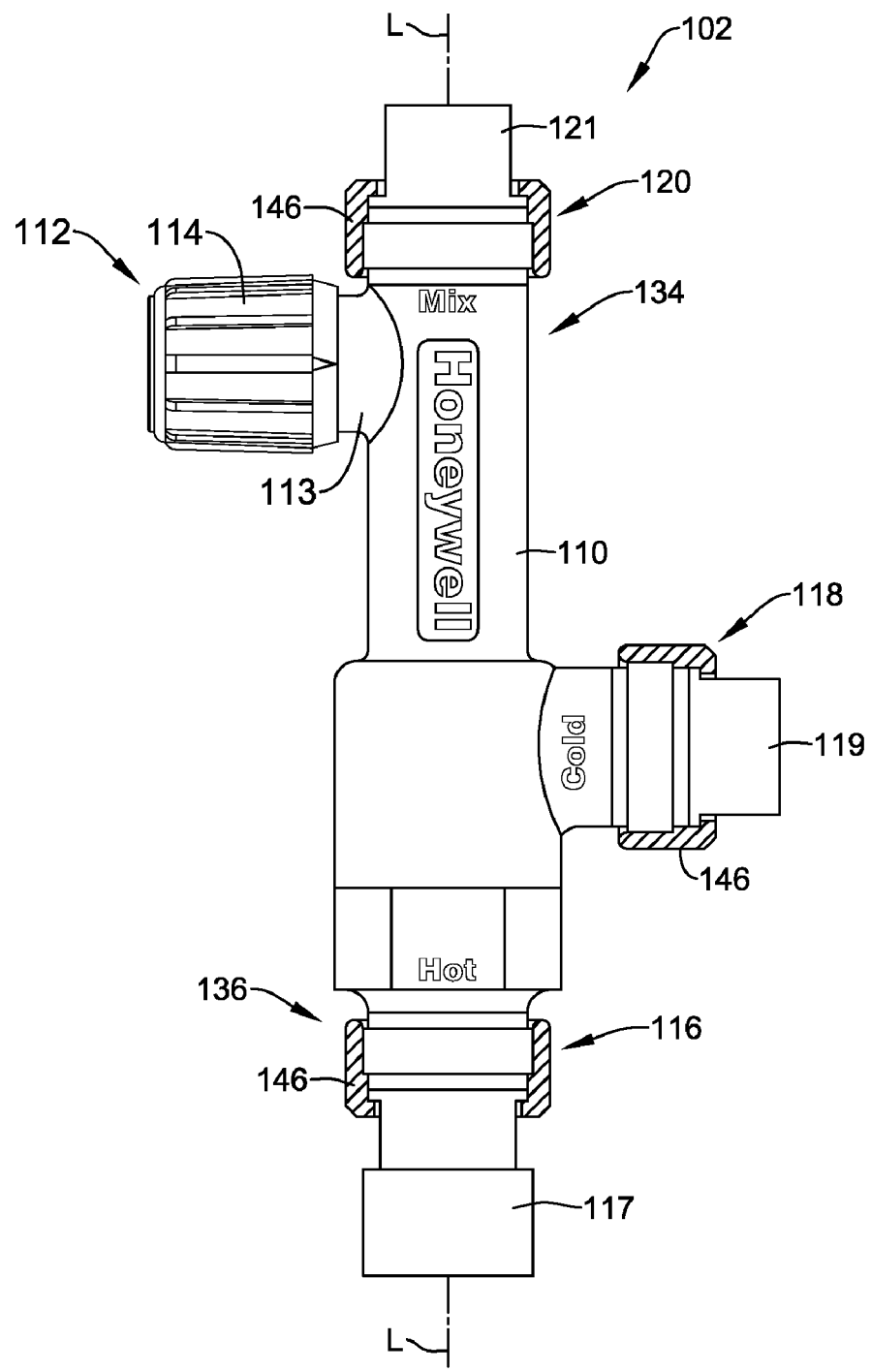
FIG. 3 is a front elevation view, with parts in cross-section, of another illustrative thermostatic mixing valve having a temperature adjustment mechanism and a tamper resistant feature.

FIG. 3 is a front elevation view, with parts in cross-section, of another illustrative thermostatic mixing valve having a temperature adjustment mechanism and a tamper resistant feature. While the configuration of mixing valve 102 is different from that of mixing valve 2, its general function is similar. Similar to that discussed above with respect to FIG. 1, mixing valve 102 of FIG. 3 has a hot fluid inlet 116, a cold fluid inlet 118, and a mixed fluid outlet 120. The hot fluid inlet 116, cold fluid inlet 118, and mixed fluid outlet 120 can each include a tailpiece fitting 117,119,121 or other suitable connector for connecting the ports 116,118,120 to a water system. Threaded couplings 146 can be used to secure each of the tailpiece fittings 117,119,121 to the valve body 110, but this is not required. The mixing valve 102 may also include an optional recirculation inlet (not shown) configured to receive tempered water, and can include a tailpiece fitting (not shown) or other suitable connector. Similar to the embodiment shown in FIG. 1, mixing valve 102 may also include an optional secondary hot port (not shown) for providing hot water to appliances or other fixtures that do not require tempered hot water, such as but not limited to dishwashers, clothes dryers, humidifiers, etc.

As can be further seen in FIG. 3, the mixing valve 102 may have a vertical, in-line configuration wherein the hot fluid inlet 116 and mixed fluid outlet 120 are vertically and axially aligned along an axis L of the valve body 110. As discussed above, this may allow the mixing valve to be mounted "in line" with a water heater hot water outlet pipe, which can simplify installation. As shown, the cold water inlet 18, in turn, may enter the valve body 110 at an angle orthogonal to the longitudinal axis L to permit direct access to the cold water inlet port provided on many conventional water heaters. The recirculation inlet, when provided, may enter the valve body 110 at an angle orthogonal to the longitudinal axis L, but in a direction opposite that of the cold water inlet 118, or any location desired. The secondary hot port, when provided, may exit the valve body 110 at an angle orthogonal to the longitudinal axis L to permit direct access to the secondary hot port, but this is not required.

Similar to the embodiment described in FIG. 1, during operation the mixing valve 102 can be adjusted to proportionately mix hot and cold water received at each of the water inlets 116,118, in order to provide tempered water at a relative constant temperature through mixed water outlet 120. As previously discussed, in certain applications, for example, the mixing valve 102 can be configured to output water at a relatively constant mixed water temperature of about 120° F., while permitting a water heater to operate at elevated temperatures in the range of, for example, about 120° F. to 180° F. It should be understood, however, that the mixing valve 102 and/or water heater can be configured to operate at other temperature ranges, if desired.

A temperature adjustment device 112 is shown disposed within a side housing 113 of the valve body 110. The temperature adjustment device 112 can be used to adjust the temperature of fluid discharged from the mixed fluid outlet 120 of the mixing valve 102. In residential water heating systems, for example, the temperature adjustment device 112 can be used to adjust the mixing valve 102 to output tempered water at a set-point temperature in the range of about 70° F. to 145° F., 70° F. to 120° F., 90° F. to 130° F., or within any other suitable range, as desired. The set-point temperature selected by the temperature adjustment device 112 may vary depending on the application. In the illustrative embodiment, the temperature adjustment device 112 may include a hand wheel 114 for adjusting the set-point of the mixing valve 102.

Figure 4:
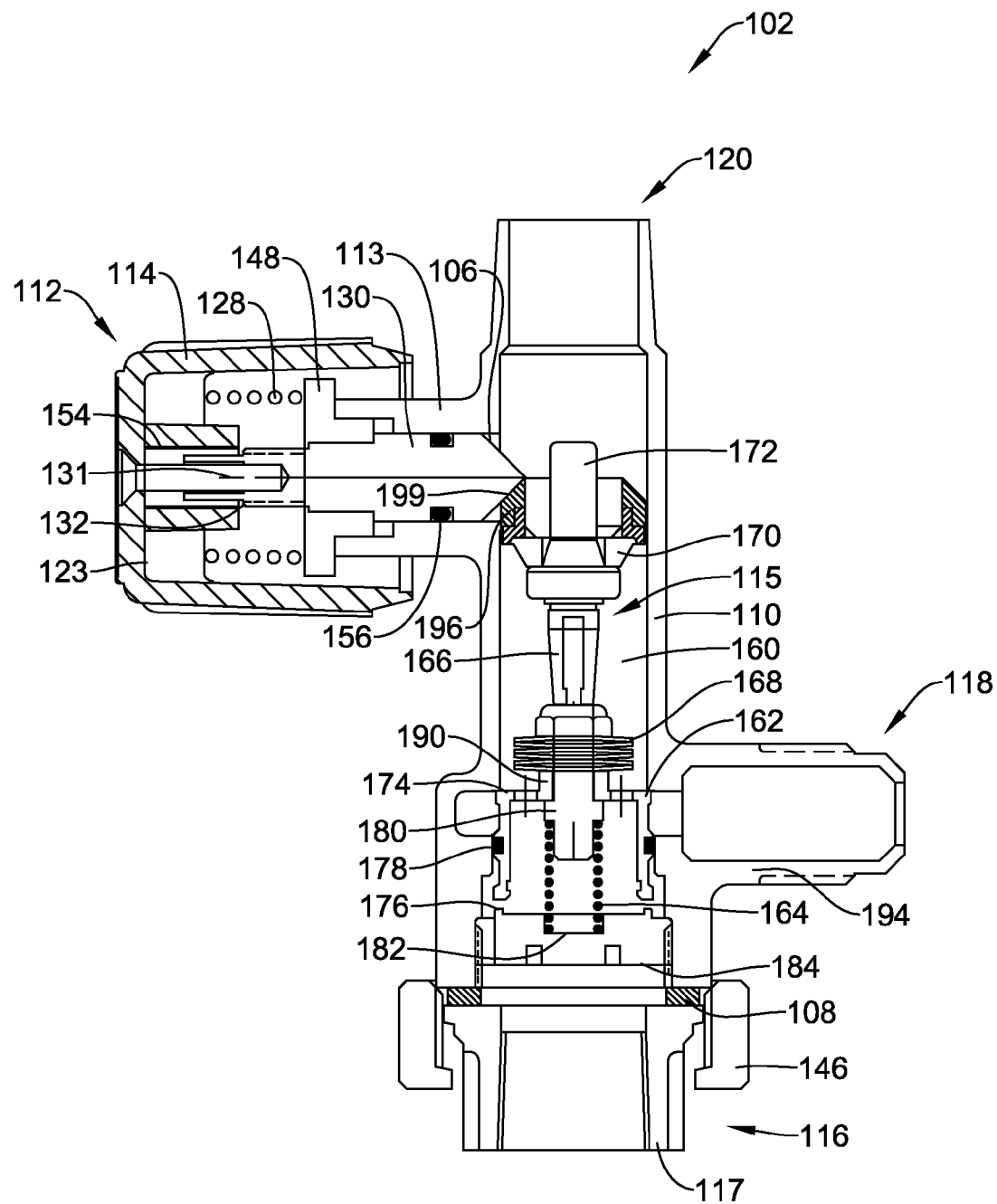
FIG. 4 is a cross-sectional view of the illustrative thermostatic mixing valve of FIG. 3.

FIG. 4 is a cross-sectional view showing the interior structure of the illustrative mixing valve 102 of FIG. 3. As shown in FIG. 4, the hot fluid inlet 116 of the valve body 110 may include gasket 108 adapted to frictionally secure a tailpiece fitting 117 to the valve body 110. The tailpiece fitting 117, in turn, can be secured to the valve body 110 using a threaded coupling 146. Such a configuration may permit the tailpiece fitting 117 to be separately connected to a pipe or a conduit supplying hot water from a water heater, and attached thereto using the threaded coupling 146. A similar arrangement can be provided for connecting tailpiece fittings to the cold fluid inlet 118 and mixed fluid outlet 120, if desired.

The cold fluid inlet 118 of the valve body 110 may include a side housing 194 adapted to receive a tailpiece fitting. In certain embodiments, the side housing 194 may further include an internal check valve (not shown) configured to prevent backflow of fluid back through the cold fluid inlet 118. It is contemplated that the check valve 192 may be placed at other locations within or external to the mixing valve 102, as desired.

As shown in FIG. 4, the mixing valve 102 may include a fluid flow regulator 115 for adjusting the flow of cold and hot fluid injected into a mixing chamber 160 of the valve body 110. In the illustrative embodiment, the fluid flow regulator 115 includes a spool 162, a modulating spring 164, a piston stem 166, a bypass spring 168, a diffuser 170, and a temperature sensitive (e.g. wax filled) thermal element 172.

The spool 162 may be movably disposed between a first inner surface 174 of valve body 110 and a second inner surface 176 of the valve body 110 in a direction substantially aligned with the general longitudinal axis L. The distance between the first inner surface 174 of the valve body 110 and the second inner surface 176 thereof is referred to as the spool stroke, and is typically greater than the overall axial length of the spool 162 to permit the spool 162 to travel up and down within the interior of the valve body 110. An O-ring 178 can be provided to frictionally support the spool 162 within the valve body 110 as the spool 162 is actuated between the first and second inner surfaces 174,176. In some embodiments, the spool 162, valve body 110 as well as other internal components of the mixing valve 102 can be coated with a layer of Teflon® or other suitable lubricous material to facilitate movement of the spool 162 within the valve body 110 and/or to prevent mineral buildup from occurring within the mixing valve 102, but this is not required.

The spring 164 can be used to bias the spool 162 towards the first inner surface 174 of the valve body 110, and can be operatively coupled at a first (i.e. upper) end to a hub 180 which is coupled to the lower end of the piston stem 166, and at a second (i.e. lower) end to a portion 182 of the end cap 184. The bypass spring 168 can be provided to further load the spool 162 and spring 164. The spring 164 and bypass spring 168 can be operatively coupled to the piston stem 166, which can be configured to move within the valve body 110 as a result of the axial expansion and contraction of the thermal element 172 in response to the temperature of fluid contained within the mixing chamber 160.

The diffuser 170 may be configured to help mix or blend hot and cold fluid contained within the mixing chamber 160 prior to passing upwardly beyond the thermal element 172 and out the mixed fluid outlet 120. The diffuser 170 may be formed as a separate element from the piston stem 166 or can be formed integral therewith from a single piece of material. In certain embodiments, for example, the piston stem 166 and diffuser 170 can be formed from a single composite piece of polypropylene loaded with fiberglass, although other configurations are contemplated.

The temperature adjustment device 112 may include an adjustment mechanism that is rotatably disposed within the side housing 113 of the valve body 110. In certain embodiments, the adjustment mechanism may include an adjusting screw 130, a collar 148, an O-ring 156, and a spring element 128 disposed within a hand wheel 114, allowing the user to adjust the temperature or set-point of the fluid discharged from the mixed fluid outlet 120 of the mixing valve 102 without any special tools, yet help prevent accidental adjustment of the output mixed temperature.

The hand wheel 114 may have a first engagement surface 154 while the adjusting screw 130 may have a second engagement surface 132. In the illustrative embodiment shown, the center support 154 may extend orthogonally outward from an internal surface 123 of the hand wheel 114, and may include a hole or recess extending therethrough. The first engagement surface 154 may be formed or otherwise disposed on the internal surface of the hole or recess of the center support 154 as shown, and may be formed as gear-like teeth. In FIG. 4, the hand wheel 114 is movable in an axial direction toward the adjusting screw 130, and rotatable relative to the attachment screw 130.

Hand wheel 114 is shown in a non-temperature adjusting position in FIG. 4. When in the non-temperature adjusting position, the first engagement surface 154 is disengaged from the second engagement surface 132. As such, the hand wheel 114 can be rotated without causing rotation of the adjusting screw 130. Since the adjusting screw 130 is not rotated, the output temperature of the mixing valve 102 is not manipulated. This may help prevent accidental and/or unintentional manipulation of the output temperature of the mixing valve 102 by a user. Spring 128 biases the hand wheel 114 into the non-temperature adjusting position.

The temperature of the fluid exiting the mixed outlet port 120 of the mixing valve 120 may be adjusted by moving the hand wheel 114 axially towards the valve body 110, overcoming the bias of the spring 128, to a temperature adjusting position. When in the temperature adjusting position, the first engagement surface 154 may become engaged with the second engagement surface 132. Once engaged, the hand wheel 114 may be turned in a clockwise or counterclockwise direction resulting in the rotation of the adjusting screw 130. In the illustrative embodiment, this causes the adjusting screw 130 to move axially along axis 131 in a direction that corresponds to the direction that the hand wheel 114 was turned. The O-ring 156 disposed within the interior of the side housing 113 can be configured to provide a fluidic seal for the adjustment screw 130 while permitting axial movement of the adjusting screw 130 along the axis 131.

In the illustrative embodiment, a collar 196 movably disposed within the mixing chamber 160 in a direction axially along the longitudinal axis L of the valve body 110, is configured to engage the fluid flow regulator 115 for adjusting the nominal positioning of the spool 162 within the valve body 110. The nominal position of the spool 162 within the valve body defines the "set-point" of the mixing valve 102. The illustrative collar 196 defines an angled surface 199 that is adapted to engage a tapered section 106 of the adjusting screw 130. During use, the temperature selection device 112 is operable by moving the hand wheel 114 axially along axis 131 until the first engagement surface 154 engages the second engagement surface 132. The hand wheel 114 is then turned in either a clockwise or counterclockwise direction, causing the adjusting screw 130 and adjusting stem 152 to move axially along axis 131. As the adjusting screw 130 moves, the tapered section 106 of the adjusting screw 130 moves the collar 196 and thus the nominal position of the spool 162 in either an upward or downward direction, respectively, within the valve body 110.

Rotation of the adjustment screw 130 in a clockwise direction, for example, causes the tapered section 106 to push the collar 196 and thus the nominal position of the spool 162 in a downward direction within the valve body 110. This increases the amount of compression within the spring 164 and moves the spool 162 further towards the second inner surface 176 of the valve body 110. Conversely, rotation of the adjustment screw 130 in a counterclockwise direction causes the tapered section 106 to move the collar 196 and thus the nominal position of the spool 162 in an upward direction within the valve body 110. This decreases the amount of compression within the spring 164 and moves the spool 162 towards the first inner surface 174 of the valve body 110. Such adjustment of the distance of the spool 162 between the first and second inner surfaces 174,176 results in a nominal change in the ratio of hot and cold water mixed within the mixing valve 110, resulting in a change in the "set-point" temperature of fluid discharged from the mixing valve 102.

Figure 5:
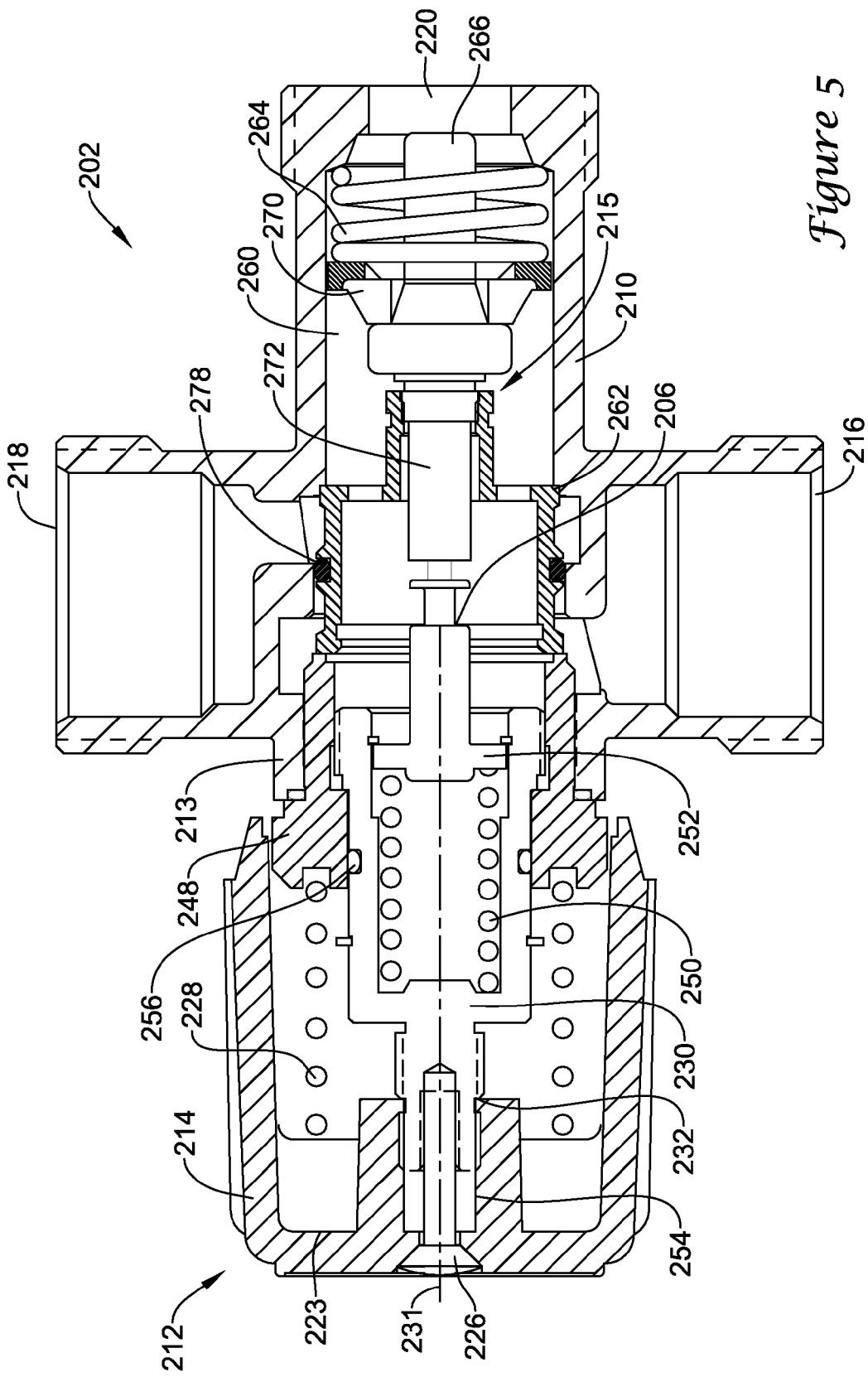
FIG. 5 is a cross-sectional view of another illustrative thermostatic mixing valve, with a hand wheel in a non-temperature adjusting position.
Figure 6:
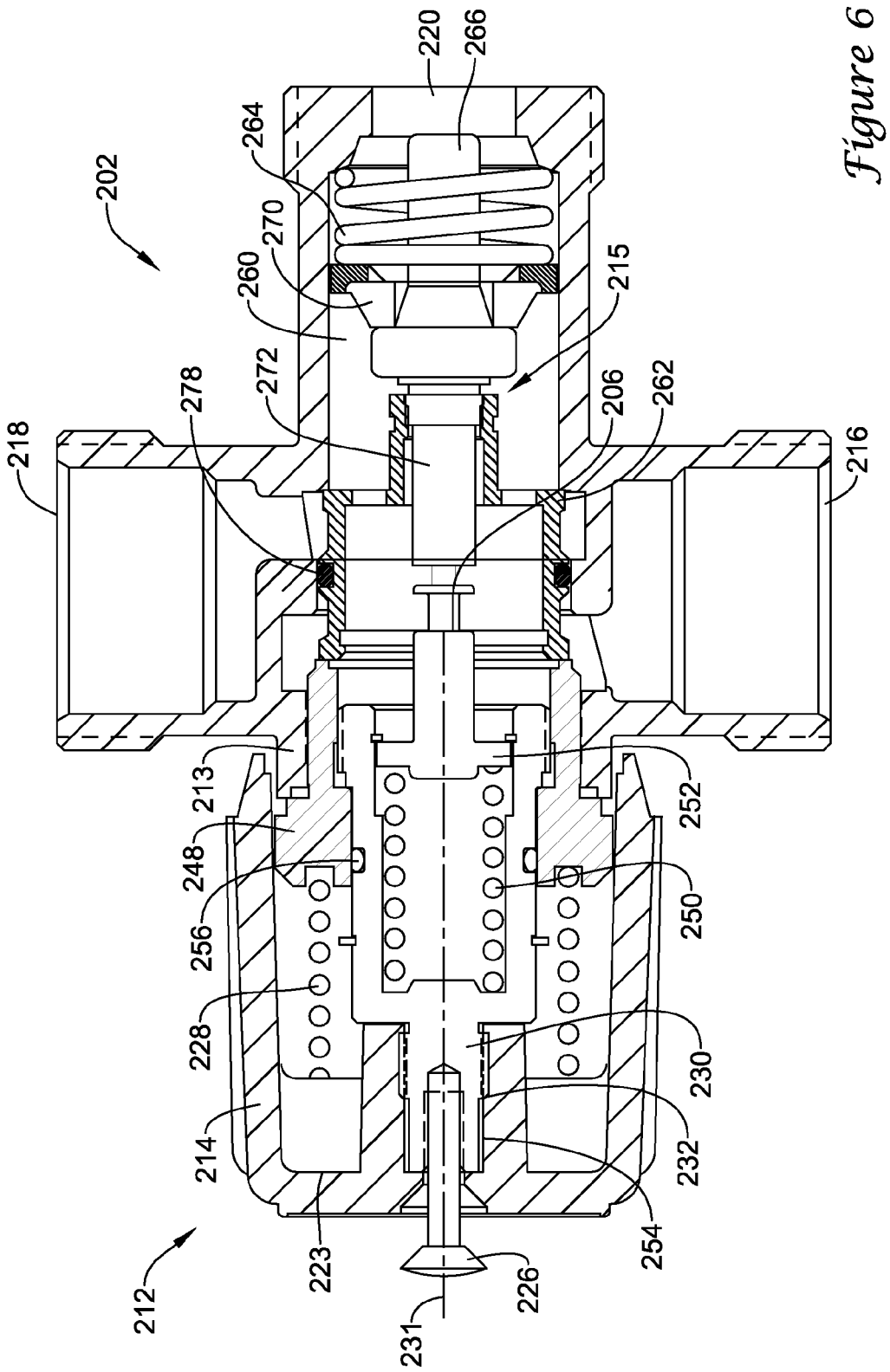
FIG. 6 is a cross-sectional view of the illustrative thermostatic mixing valve of FIG. 5 with the hand wheel in a temperature adjusting position.

FIG. 5 is a cross-sectional view of another illustrative thermostatic mixing valve 202, with a hand wheel in a non-temperature adjusting position, and FIG. 6 is a cross-sectional view of the illustrative thermostatic mixing valve 202 of FIG. 5 with the hand wheel in a temperature adjusting position. In the illustrative embodiment, the mixing valve 202 has a hot water inlet 216, a cold water inlet 218, and a mixed water outlet 220. Mixing valve 202 may also have a secondary hot port (not shown) as discussed with respect to FIG. 1. Similarly, mixing valve 202 may also have a recirculation inlet (not shown), if desired.

The temperature selection device 212 is axially aligned with mixing chamber 260 and the mixed water outlet 220. It is contemplated that mixing valve 202 may have a regulator system 215 similar to that shown and described with reference to FIG. 4. In this illustrative embodiment, the regulator system 215 is axially aligned with the temperature selection device 212 as shown.

The temperature selection device 212 includes a hand wheel 214, which may function in a similar manner as the hand wheel 114 shown and described with reference to FIG. 4. The temperature adjustment device 212 may further include a temperature adjustment mechanism rotatably disposed within the side housing 213 of the valve body 210. In certain embodiments, the adjustment mechanism may include an adjusting stem 252, a spring 250 for biasing the adjusting stem 252 towards the fluid flow regulator 215, an adjusting screw 230, a collar 248, an O-ring 256, and a second spring 228 disposed within a hand wheel 214, allowing the user to adjust the temperature of fluid discharged from the mixing valve 202 without needing any special tools.

In the illustrative embodiment, hand wheel 214 may include a first engagement surface 254 while the adjusting screw 230 may include a second engagement surface 232 that is configured to releasably engage the first engagement surface 254. As described above with respect to hand wheel 114, hand wheel 214 may have a non-temperature adjusting position (shown in FIG. 5), and a temperature adjusting position (shown in FIG. 6). When in the non-temperature adjusting position, the first engagement surface 254 is disengaged from the second engagement surface 232. As such, rotation of the hand wheel 214 does not cause a corresponding rotation of the adjusting screw 230. This may help prevent accidental and/or un-intentional manipulation of the output temperature of the mixing valve 202. Spring 228 may bias the hand wheel 214 into the non-temperature adjusting position.

The temperature "set-point" of the fluid exiting the mixed outlet port 220 may be adjusted by moving the hand wheel 214 axially towards the valve body 210 to a temperature adjusting position (see FIG. 6). When in the temperature adjusting position, the first engagement surface 254 is engaged with the second engagement surface 232. Then, to adjust the temperature of the mixed fluid, the hand wheel 214 may be turned in a clockwise or counterclockwise direction resulting in rotation of the adjusting screw 230. This causes the adjusting stem 252 to move axially along axis 231. The O-ring 256 disposed within the interior of the side housing 213 can be configured to provide a fluidic seal for the adjustment screw 230 while permitting axial movement of the adjustment screw 230 along axis 231.

In the illustrative embodiment, fluid flow regulator 215 is movably disposed within the mixing chamber 260 in a direction axially along the axis 231. Movement of the adjusting stem 252 moves the fluid flow regulator 215 and adjusts the nominal relative flow of water from the cold fluid inlet 218 and the hot fluid inlet 216 and into the mixing chamber 260. In the illustrative embodiment, regulator 215 includes a spool 262, spring 264, piston stem 266, diffuser 270, thermal element 272, and o-ring 278 to control the relative flow of hot and cold water. Regulator 215 may operate similar to regulator 115 shown and described with respect to FIG. 4.

In use, the temperature selection device 212 is operable by moving the hand wheel 214 axially along axis 231 against the bias of spring 228 to engage the first engagement surface 254 with the second engagement surface 232. Once pressed in (see FIG. 6), turning the hand wheel 214 in either a clockwise or counterclockwise direction causes the adjustment stem 252 to move the regulator 215 along the axis 231 within the valve body 210. Such adjustment of the regulator 215 along axis 231 results in a change in the nominal ratio of hot and cold water mixed within the mixing valve 210, resulting in a change in the temperature "set-point" of the fluid discharged from the mixing valve 202.

When the hand wheel 214 is released, the spring 228 may push the hand wheel 214 away from the valve body along axis 231 such that the first engagement surface 254 disengages from the second engagement surface 232 (see FIG. 5). As such, turning the hand wheel 214 in either a clockwise or counterclockwise direction does not causes the adjustment stem 252 to move the regulator 215 along the axis 231 within the valve body 210. As can be seen in FIG. 6, and in the illustrative embodiment, the attachment screw 226 does not move axially with the hand wheel 214.

Figure 7:
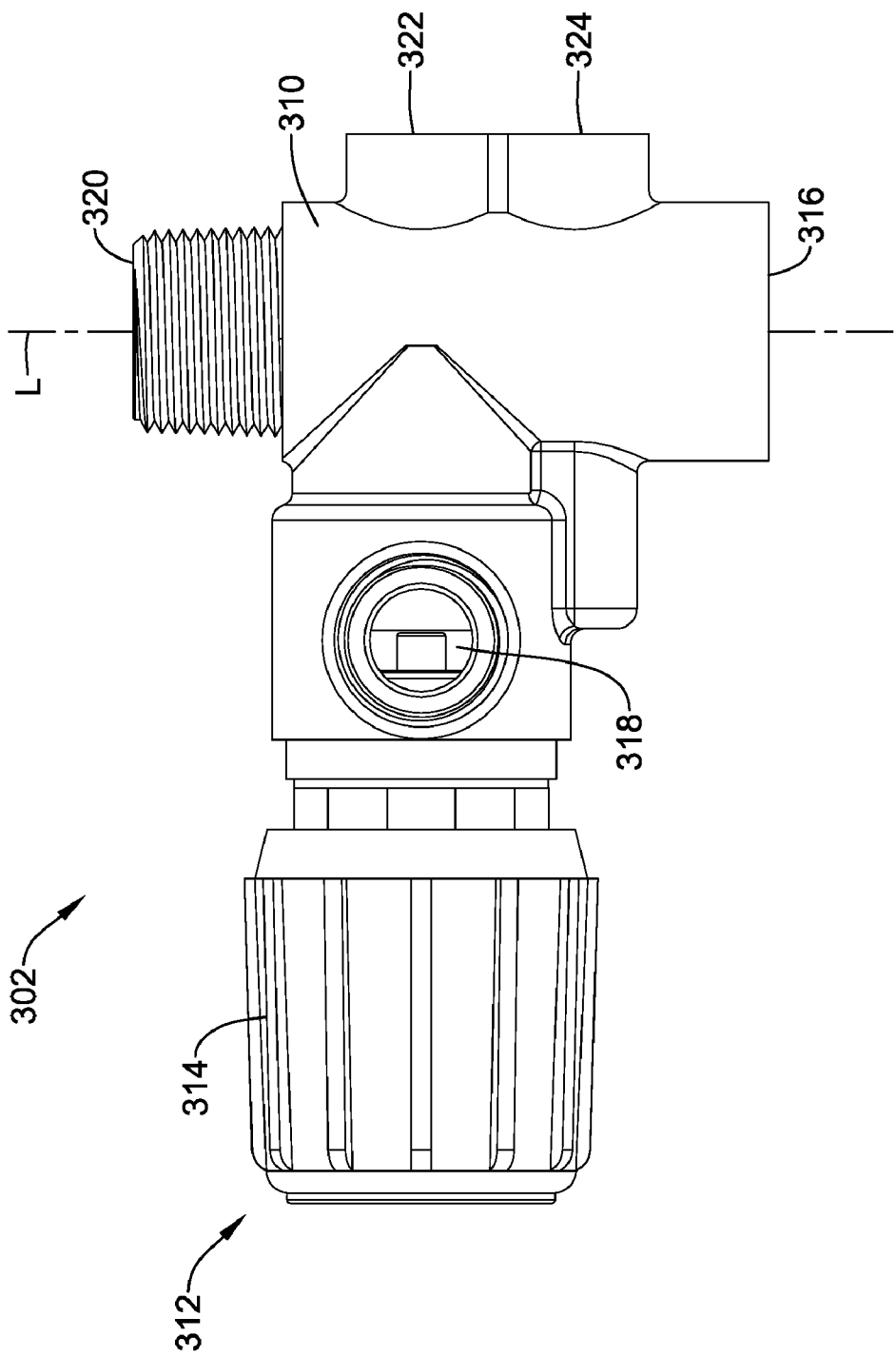
FIG. 7 is a side view of another illustrative thermostatic mixing valve with a secondary hot port, a temperature adjustment mechanism, and a tamper resistant feature.

FIG. 7 is a side view of another illustrative thermostatic mixing valve 302 with a secondary hot port, a temperature adjustment mechanism, and a tamper resistant feature. While the configuration of mixing valve 302 is slightly different from that of mixing valves 2,102,202, the general function of valve 302 is similar to that of valves 2,102,202. As discussed above with respect to FIGS. 1, 3, and 5, mixing valve 302 may have a hot fluid inlet 316, a cold fluid inlet 318, and a mixed fluid outlet 320. The hot fluid inlet 316, cold fluid inlet 318, and mixed fluid outlet can include a tailpiece fitting or other suitable connector for connecting the ports 316,318,320 to the water piping within a building or other structure.

As shown, the illustrative mixing valve 302 may include an optional recirculation inlet 322 configured to receive tempered water, and can include a tailpiece fitting (not shown) or other suitable connector. Similar to the embodiment shown in FIG. 1, mixing valve 302 may include an optional secondary hot port 324 for providing hot water to appliances or other fixtures that do not require tempered hot water, such as but not limited to dishwashers, clothes washers, humidifiers, etc. The secondary hot port 324 can include a tailpiece fitting (not shown) or other suitable connector. The tailpiece fittings may each include a union sweat fitting, threaded fitting (e.g. NPT, NPS, etc.), compression fitting, PEX fittings, and/or any other suitable fittings for connecting the various inlets and outlets of the mixing valve 302 to the other components of the system. A threaded coupling (not shown) can be used to secure each of the tailpiece fittings to the valve body 310, if desired.

As can be seen in FIG. 7, the mixing valve 302 may have a configuration whereby the hot fluid inlet 316 and mixed fluid outlet 320 are vertically and axially aligned along an axis L of the valve body 310. This may allow the mixing valve 302 to be mounted "in line" with a water heater hot water outlet pipe, which can simplify installation. The cold water inlet 318, in turn, may enter the valve body 310 at an angle orthogonal to the longitudinal axis L to permit direct access to the cold water inlet port provided on many conventional water heaters. In the illustrative embodiment of FIG. 7, recirculation inlet 322 is shown entering the valve body 310 at an angle orthogonal to the longitudinal axis L, but in a direction perpendicular to that of the cold water inlet 318. In some cases, recirculation inlet 322 may enter valve body 310 at a different angle, if desired. While mixing valve 302 is shown as having recirculation inlet 322, the recirculation inlet 322 is optional and thus may be excluded. Likewise, the secondary hot port 324 may exit the valve body 310 at an angle orthogonal to the longitudinal axis L to permit direct access to the secondary hot port 324. In the illustrative embodiment, the secondary hot port 324 is positioned at a location upstream from a mixing chamber such that non-tempered hot water is available directly from the hot water source. As with the recirculation inlet 322, the secondary hot port 324 is optional and not required.

Figure 7A:
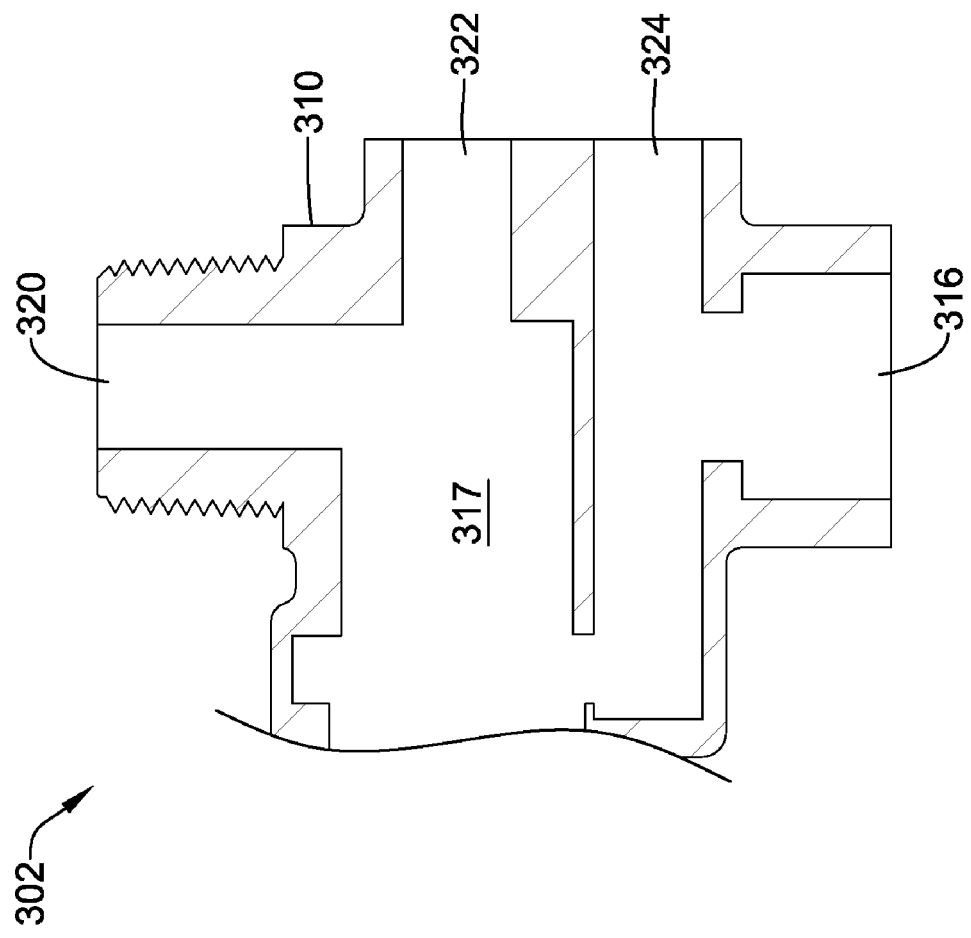
FIG. 7A is a partial cross-sectional view of the illustrative thermostatic mixing valve of FIG. 7.

FIG. 7A is a partial cross-section of the illustrative mixing valve 302 shown in FIG. 7. The temperature adjustment portion of the valve has been removed for clarity. As can be further seen in FIG. 7A, the mixing valve 302 may have a configuration wherein the hot fluid inlet 316 and mixed fluid outlet 320 are vertically and axially aligned along an axis of the longitudinal portion of valve body 310. This may allow the mixing valve to be mounted "in line" with a water heater hot water outlet pipe, which can simplify installation. The cold water inlet (not shown), in turn, may enter the valve body 310 at an angle orthogonal to the longitudinal axis to permit direct access to the cold water inlet port provided on many conventional water heaters. The hot fluid and cold fluid may be in fluid communication with mixing chamber 317 where the hot and cold fluids may mix prior to exiting the valve through the mixed fluid outlet 320, which may also be in fluid communication with mixing chamber 317. While not explicitly shown in this embodiment, in some embodiments, the mixing of the hot and cold fluids may be facilitated with a mixing mechanism such as that discussed with respect to FIGS. 4-6.

The illustrative mixing valve 302 may also include an optional secondary hot port 324 for providing hot water directly to an appliance or other fixture that can use non-tempered hot water (e.g. water provided directly from a water heater or the like). As can be seen in FIG. 7A, the secondary hot port 324 may be disposed at a location upstream of the mixing chamber 317 such that non-tempered water may be available directly from the mixing valve 2. For example, the optional secondary hot port 324 may be used to supply non-tempered hot water to a dishwasher, a clothes washer, a humidifier, and/or any other suitable appliance, fixture or device, as desired. The secondary hot port 324 may reduce or eliminate the need for a separate "T" connector off of the water heater source.

In some embodiments, the mixing valve 302 may also include an optional recirculation inlet 322 in fluid communication with a return pipe or conduit that can be used to recirculate tempered water discharged from the mixed water outlet 320 back into the mixing valve 302. In use, the ability to recirculate water through the mixing valve 302 may help prevent cold water from building up within the mixed water pipe or conduit during periods of nonuse, or when the demand for mixed water is low. Such recirculation feature within the mixing valve 302 can also be used to overcome the characteristic of many thermostatic mixing valves to overshoot the desired mixing temperature after relatively long periods of nonuse (e.g. overnight) or shortly after a previous draw.

Figure 8:
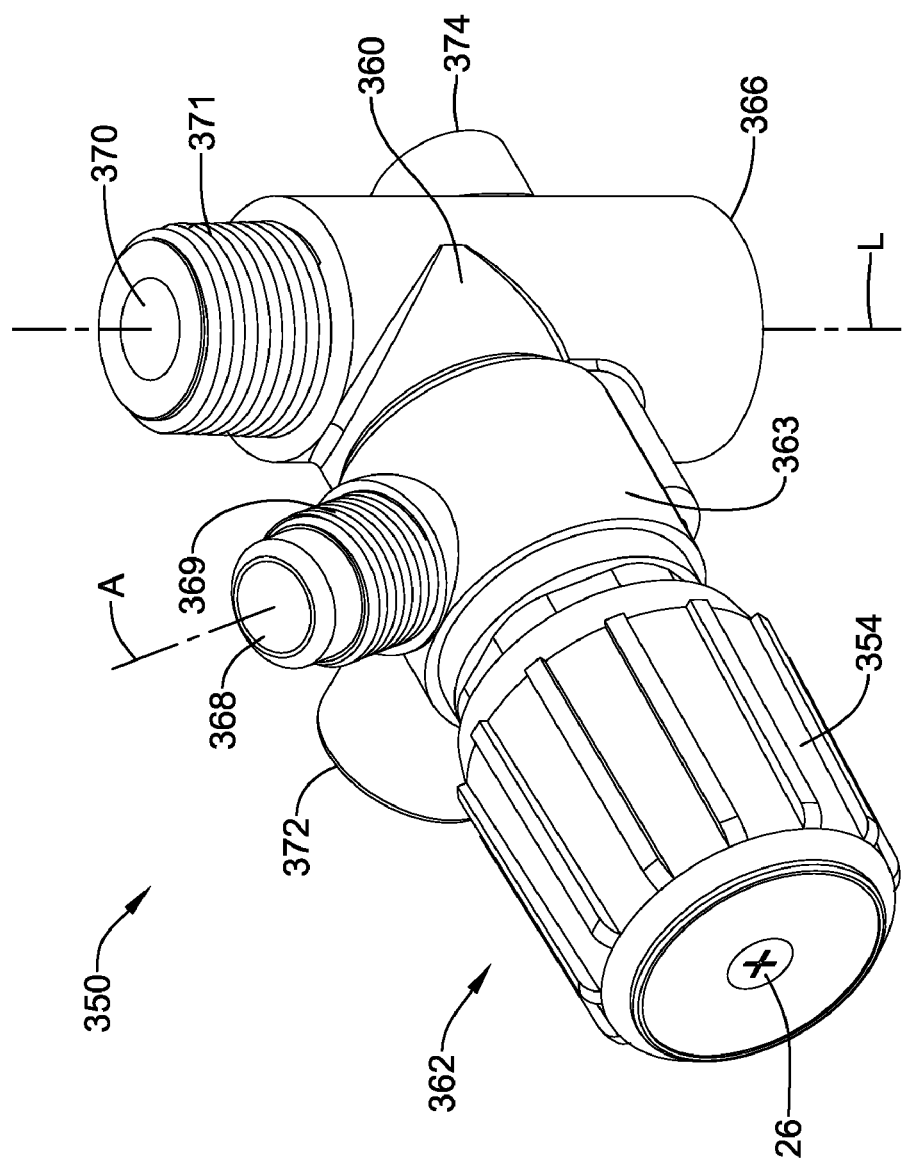
FIG. 8 is a perspective view of another illustrative but non-limiting thermostatic mixing valve having a temperature adjustment mechanism and a tamper resistant feature.

FIG. 8 is a perspective view of another illustrative thermostatic mixing valve 350 with a secondary hot port, a temperature adjustment mechanism, and a tamper resistant feature. While the configuration of mixing valve 350 is slightly different from that of mixing valves 2,102,202,302, the general function of valve 350 is similar to that of valves 2,102,202. As discussed above with respect to FIGS. 1, 3, 5, and 7, mixing valve 350 may have a hot fluid inlet 366, a cold fluid inlet 368, and a mixed fluid outlet 370. The hot fluid inlet 366, cold fluid inlet 368, and mixed fluid outlet 370 can include a tailpiece fitting 369, 371 or other suitable connector for connecting the ports 366,368,370 to the water piping within a building or other structure.

As shown, the illustrative mixing valve 350 may include an optional recirculation inlet 372 configured to receive tempered water, and can include a tailpiece fitting (not shown) or other suitable connector. Similar to the embodiment shown in FIG. 1, mixing valve 350 may include an optional secondary hot port 374 for providing hot water to appliances or other fixtures that do not require tempered hot water, such as but not limited to dishwashers, clothes washers, humidifiers, etc. The secondary hot port 374 can include a tailpiece fitting (not shown) or other suitable connector. The tailpiece fittings may each include a union sweat fitting, threaded fitting (e.g. NPT, NPS, etc.), compression fitting, PEX fittings, and/or any other suitable fittings for connecting the various inlets and outlets of the mixing valve 350 to the other components of the system. A threaded coupling (not shown) can be used to secure each of the tailpiece fittings to the valve body 360, if desired.

As can be seen in FIG. 8, the mixing valve 350 may have a configuration whereby the hot fluid inlet 366 and mixed fluid outlet 370 are vertically and axially aligned along an axis L of the valve body 370. This may allow the mixing valve 350 to be mounted "in line" with a water heater hot water outlet pipe, which can simplify installation. The cold water inlet 368, in turn, may enter the valve body 360 at an angle along axis A, or any angle desired, to the side housing 363 of the valve body orthogonal to alleviate any interference issues that may occur. In the illustrative embodiment of FIG. 8, recirculation inlet 372 is shown entering the valve body 360 at an angle orthogonal to the longitudinal axis L, but in a direction approximately perpendicular to that of the cold water inlet 368. In some cases, recirculation inlet 372 may enter valve body 360 at a different angle, if desired. While mixing valve 350 is shown as having recirculation inlet 372, the recirculation inlet 372 is optional and thus may be excluded. Likewise, the secondary hot port 374 may exit the valve body 360 at an angle orthogonal to the longitudinal axis L to permit direct access to the secondary hot port 374. In the illustrative embodiment, the secondary hot port 374 is positioned at a location upstream from a mixing chamber such that non-tempered hot water is available directly from the hot water source. As with the recirculation inlet 372, the secondary hot port 374 is optional and not required.

Figure 9:
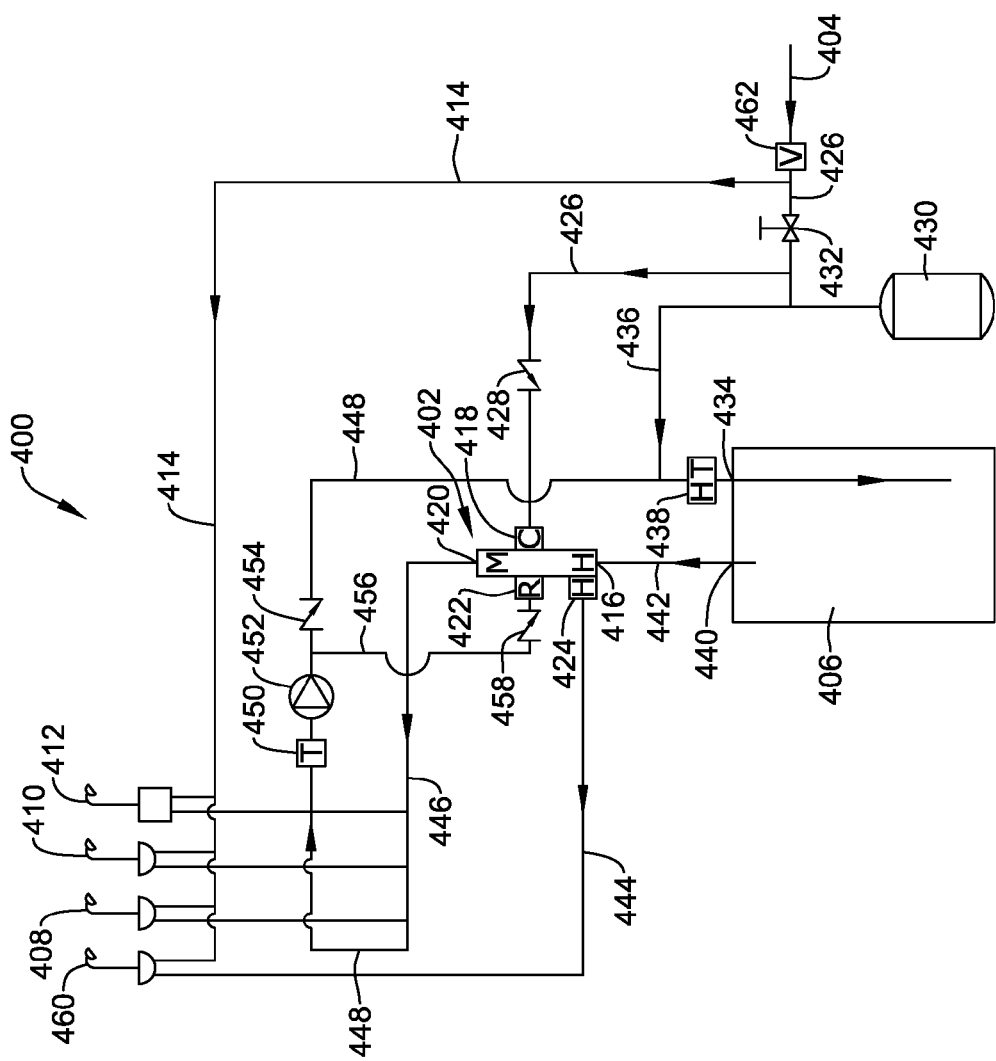
FIG. 9 is a schematic view showing an illustrative water heater system employing a thermostatic mixing valve with a temperature adjustment mechanism and a tamper resistant feature.

FIG. 9 is a schematic view showing an illustrative but non-limiting water heater system 400 employing a thermostatic mixing valve 402 that may be similar to the thermostatic mixing valves 2, 102, 202, 302 described herein. As shown in FIG. 9, thermostatic mixing valve 402 may be installed within a water heater system 400 having a cold water supply 404, a water heater 406, and a number of fixture units 408,410,412, 460, in fluid communication with the mixing valve 402, cold water supply 404, and water heater 406. Water heater system 400 may represent, for example, a residential water heater system adapted to deliver hot water to a number of fixture units such as a shower, bath, lavatory, faucet, clothes washer, dishwasher, or other such device wherein the delivery of tempered hot water is desired.

Cold water supplied by the cold water supply 404 can be delivered through a first pipe or conduit 414 for delivery directly to each of the fixture units 408,410,412,460 within the system 400. A second pipe or conduit 426 in fluid communication with a cold water inlet 418 of the mixing valve 402 and a check-valve 428, in turn, may be used to supply cold water to the mixing valve 402, which can be mixed with hot water discharged from the water heater 406. A backflow preventer, check valve, pressure reducing valve, or other suitable mechanism 462 for controlling backflow at the inlet of the cold water supply 404 can be provided to make the system 400 a closed system, if desired. In such embodiments, an expansion tank 430 can be provided in fluid communication with the water heater 406 to relieve any excess pressure within the water heater 406 and/or to prevent the discharge of water from the safety relief valve provided on many water heaters. A shut-off valve 432 can also be provided along the pipe or conduit 426 to permit the user to shut-off the supply of water delivered to the mixing valve 402 and/or water heater 406, if desired.

An inlet port 434 of the water heater 406 can be configured to receive cold water via a water heater inlet pipe 436 in fluid communication with pipe or conduit 426. If desired, the inlet port 434 of the water heater 406 can be equipped with an optional heat trap 438 for reducing convection currents at the inlet port 434 of the water heater 406 that can cause thermosiphoning of heat from the water heater 406.

An outlet port 440 of the water heater 406 can be configured to deliver hot water through pipe or conduit 442 and into a hot water inlet 416 of the mixing valve 402. The outlet port 440 of the water heater 406 will typically be located close to the hot water inlet 416 of the mixing valve 402 (e.g. $\leqq 1$ ft) to reduce head and thermal losses through pipe or conduit 442. In certain embodiments, for example, the hot water inlet 416 of the mixing valve 402 can be coupled directly to the outlet port 440 of the water heater 406 using a threaded pipe fitting, union sweat connection, or other suitable connector. If desired, a diverter pipe 444 in fluid communication with a secondary hot port 424 on the mixing valve can be provided to divert some of the hot water discharged from the water heater 406 to other fixtures 460 within the system 400 (e.g. a dishwasher, clothes washer, humidifier, etc.) where temperature regulation via the mixing valve 402 may be undesired.

During operation, the mixing valve 402 can be configured to proportionately mix cold and hot water received at each of the water inlets 418,416, which can then be outputted as tempered water at a relatively constant, pre-selected temperature through a mixed water outlet 420 and hot water piping or conduit 446 in fluid communication with each of the fixture units 404,405,406 that require tempered water. In certain applications, for example, the mixing valve 402 can be configured to output water at a relatively constant mixed water temperature of about 120° F. while permitting the water heater 406 to operate at elevated temperatures in the range of, for example, about 120° F. to 180° F.

Such an increase in the operating temperature of the water heater 406 can result in an increased amount of effective hot water capacity available for use. For an 80-gallon water heater, for example, such an increase in the operating temperature may result in an increase in the effective hot water capacity to a level similar to that of a 120-gallon water heater operating at a lower temperature of 120° F. It should be understood, however, that the mixing valve 402 and/or water heater 406 can be configured to operate at other temperatures and/or temperature ranges, if desired.

While the illustrative mixing valve 402 of FIG. 9 is shown installed within a water heater system, it should be understood that the mixing valve 402 could be used in any number of applications wherein the control and regulation of fluids of dissimilar temperature is desired. Examples of other applications may include, but are not limited to, space and radiant heating applications, heat pump systems, hydronic heating applications, combination heating applications, industrial heating applications, photo processing applications, nursing home applications, greenhouse applications, and/or solar hot water applications. Moreover, in some embodiments such as space heating applications, for example, the mixing valve 402 can be configured to function as a diverting valve to permit the diversion of hot or cold water to particular fixtures within the system, if desired.

In the illustrative embodiment, the thermostatic mixing valve 402 is equipped with an optional recirculation inlet 422. A recirculation pipe or conduit 448 in fluid communication with pipe or conduit 446 can be provided to permit the recirculation of mixed water back into the inlet port 434 of the water heater 406. A thermostat 450 and pump 452 operatively coupled to the recirculation pipe or conduit 448 downstream of the fixture units 404,405,406 can be provided to intermittently draw fluid back into the water heater 406, as needed. The thermostat 450 can be set to ensure that the temperature within the recirculation pipe or conduit 448 remains at a certain temperature or range of temperatures, turning on the recirculation pump 452 periodically when the temperature therein reaches a certain minimum threshold temperature. If, desired, a check valve 454 installed downstream of the pump 452 can be provided to prevent the backflow of water into the pump 452.

The mixing valve 402 may also include a recirculation inlet 422 in fluid communication with a return pipe or conduit 456 that can be used to recirculate tempered water discharged from the mixed water outlet 420 back into the mixing valve 402. The return pipe or conduit 456 can be connected to the recirculation pipe or conduit 448 at a location downstream of the pump 452, and can include a check valve 458 to prevent the backflow of water from the mixing valve 402 into the return pipe or conduit 456. In use, the ability to recirculate water through the mixing valve 402 may help prevent cold water from building up within the mixed water pipe or conduit 446 during periods of nonuse, or when the demand for mixed water is low. Such recirculation feature within the mixing valve 402 can also be used to overcome the characteristic of many thermostatic mixing valves to overshoot the desired mixing temperature after relatively long periods of nonuse (e.g. overnight) or shortly after a previous draw.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A thermostatic mixing valve, comprising:
a valve body defining:
a cold fluid inlet port;
a hot fluid inlet port;
a mixing chamber;
a mixed fluid outlet port in fluid communication with the mixing chamber;
a hot fluid outlet port in fluid communication with the hot fluid inlet port; and
a fluid flow regulator configured to regulate the relative flow of cold and hot fluid that is injected into the mixing chamber;
wherein the hot fluid inlet port enters a first side of the valve body, and the mixed fluid outlet port exits a second side of the valve body that is opposite to the first side;
wherein the hot fluid inlet port and the mixed fluid outlet port are at least substantially aligned along a common axis;
wherein the fluid flow regulator includes a thermal element axially disposed within the mixing chamber;
wherein the thermal element is configured to expand and contract axially in a direction transverse to the common axis.

2. The thermostatic mixing valve of claim 1, wherein the hot fluid outlet port is disposed upstream of the mixing chamber.

3. The thermostatic mixing valve of claim 1, wherein during operation, a temperature of a fluid exiting the hot fluid outlet port is greater than a temperature of a fluid exiting the mixed fluid outlet port.

4. The thermostatic mixing valve of claim 1, wherein the hot fluid outlet port provides access to a hot fluid entering the hot fluid inlet port for an appliance or other fixture that can use non-tempered hot fluid.

5. The thermostatic mixing valve of claim 1, wherein the valve body further comprises a recirculation fluid inlet port.

6. The thermostatic mixing valve of claim 1, wherein the cold fluid inlet port enters the valve body along a cold fluid inlet axis that is perpendicular or substantially perpendicular to the common axis of the hot fluid inlet port and the mixed fluid outlet port.

7. The thermostatic mixing valve of claim 6, wherein the cold fluid inlet axis does not intersect the common axis of the hot fluid inlet port and the mixed fluid outlet port.

8. The thermostatic mixing valve of claim 6, wherein the valve body further comprises a recirculation fluid inlet port, wherein the recirculation fluid inlet port enters the valve body along a recirculation fluid inlet axis that is perpendicular or substantially perpendicular to the common axis of the hot fluid inlet port and the mixed fluid outlet port.

9. The thermostatic mixing valve of claim 1, wherein the valve body is a unitary valve body.

10. The thermostatic mixing valve of claim 1, wherein the valve body further comprises a temperature adjustment mechanism for adjusting the fluid flow regulator and thus the temperature of the fluid within the mixing chamber, the temperature adjustment mechanism having a non-temperature adjusting position and a temperature adjusting position.

11. The thermostatic mixing valve of claim 10, wherein the temperature adjustment mechanism includes:
a hand wheel;
an adjusting screw;
wherein the hand wheel is configured to engage the adjusting screw when the temperature adjustment mechanism is in the temperature adjusting position, and is configured to disengage the adjusting screw when the temperature adjustment mechanism is in the non-temperature adjusting position.

12. The thermostatic mixing valve of claim 11, wherein the valve body is configured such that the hot fluid inlet port and the mixed fluid outlet port are substantially axially aligned along a first axis of the valve body, the hand wheel and mixing chamber are substantially axially aligned along a second axis of the valve body, the cold inlet port is substantially axially aligned along a third axis of the valve body, and the hot fluid outlet port is substantially axially aligned along a forth axis that is parallel to the second axis, and wherein the first axis is perpendicular to the second axis and the second axis is perpendicular to the third axis.

13. The thermostatic mixing valve of claim 1, wherein the fluid flow regulator includes:
- a spool movably disposed between a first inner surface of the valve body and a second inner surface of the valve body;
- a spring configured to bias the spool towards the first surface of the valve body;
- a piston stem movably disposed within the valve body and operatively coupled to the spool and spring; and
- wherein the thermal element is operatively coupled to the piston stem, said thermal element configured to move the piston stem axially within the valve body when the thermal element expands or contracts in response to the temperature of fluid contained within the mixing chamber.

14. A thermostatic mixing valve, comprising:
- a valve body including:
  - a cold fluid inlet port;
  - a hot fluid inlet port;
  - a mixing chamber;
  - a mixed fluid outlet port in fluid communication with the mixing chamber, wherein the hot fluid inlet port and the mixed fluid outlet port are at least substantially axially aligned along a common axis; and
  - a hot fluid outlet port disposed upstream of the mixing chamber and in fluid communication with the hot fluid inlet port;
- wherein the mixing chamber is laterally offset from the common axis.

15. The thermostatic mixing valve of claim 14, further comprising a fluid flow regulator configured to regulate the relative flow of cold and hot fluid that is injected into the mixing chamber.

16. A thermostatic mixing valve, comprising:
- a valve body defining:
  - a cold fluid inlet port;
  - a hot fluid inlet port;
  - a mixing chamber in fluid communication with the hot fluid inlet port and the cold fluid inlet port;
  - a mixed fluid outlet port in fluid communication with the mixing chamber;
  - a hot fluid outlet port in fluid communication with the hot fluid inlet port and disposed upstream of the mixing chamber; and
- a temperature adjustment mechanism for adjusting the temperature of the fluid exiting the mixed fluid outlet port of the valve body, wherein the temperature adjustment mechanism includes a rotatable hand wheel that is actuatable between a non-temperature adjusting position and a temperature adjusting position, wherein in the non-temperature adjusting position, rotating the rotatable hand wheel does not adjust the temperature of the fluid exiting the mixed fluid outlet of the valve body, and in the temperature adjusting position, rotating the rotatable hand wheel does adjust the temperature of the fluid exiting the mixed fluid outlet of the valve body;
- wherein the valve body defines a first fluid flow path from the hot fluid inlet port to the mixing chamber, and a second fluid flow path from the hot fluid inlet port to the hot fluid outlet port, the second fluid flow path oriented in a substantially opposite direction to the first fluid flow path.

17. The thermostatic mixing valve of claim 16, wherein the hot fluid inlet port and the mixed fluid outlet port are at least substantially axially aligned along a common axis.

18. The thermostatic mixing valve of claim 16, wherein the valve body further defines a recirculation inlet port.

* * * * *